United States Patent [19]

Granberg et al.

[11] 4,081,799

[45] Mar. 28, 1978

[54] CHARACTER GENERATION SYSTEM FOR A VISUAL DISPLAY TERMINAL

[75] Inventors: Mauritz L. Granberg; David G. Hanson; Robert L. Rajala, all of St. Paul, Minn.

[73] Assignee: Sperry Rand Corporation, New York, N.Y.

[21] Appl. No.: 663,427

[22] Filed: Mar. 3, 1976

[51] Int. Cl.$^2$ .................................................. G06F 3/14

[52] U.S. Cl. .............................. 340/324 AD; 358/133; 178/30

[58] Field of Search .......... 340/324 AD; 178/DIG. 3, 178/30; 358/133

[56] References Cited

U.S. PATENT DOCUMENTS

| | | | |
|---|---|---|---|
| 3,573,789 | 4/1971 | Sharp et al. | 340/324 AD |
| 3,697,976 | 10/1972 | Fenton | 340/324 AD |
| 3,786,478 | 1/1974 | King, Jr. | 340/324 AD |
| 3,878,536 | 4/1975 | Gilliam | 340/324 AD |
| 3,921,164 | 11/1975 | Anderson | 340/324 AD |
| 3,969,716 | 7/1976 | Roberts | 340/324 AD |

*Primary Examiner*—Marshall M. Curtis

*Attorney, Agent, or Firm*—John B. Sowell; Kenneth T. Grace; Marshall M. Truex

[57] ABSTRACT

A system for expanding a dot-matrix for characters being displayed on a television raster scan display to improve the readability and resolution of displayed characters without a corresponding increase in the size of the Read-Only Memory (ROM) employed to generate the pattern of dots defining the characters. This result is accomplished by first displaying the identical dot-matrix stored in the ROM for each character in each row of characters to be displayed on the first pass of the raster scan. On the second pass of the raster scan, which is interlaced between the lines of the first pass of the raster scan, a new dot-matrix is inserted according to a predetermined logical real time comparison of the dot matrix of the adjacent rows of the dots produced during the first raster scan.

11 Claims, 11 Drawing Figures

CHARACTER GENERATION SYSTEM FOR A VISUAL DISPLAY TERMINAL

BACKGROUND OF THE INVENTION

1. Field of the Invention

This invention relates to visual display terminal (VDT) systems, and more particularly relates to VDT systems which employ cathode ray tubes (CRTs). Information may be generated on CRTs by raster scanning, by XY refresh or XY storage techniques. The present invention is concerned with generating alphanumeric characters employing television raster scanning and employing commercially available character generators which generate a dot-matrix defining characters in American Standard Code for Information Interchange (ASCII).

Heretofore, VDTs were well known and had been produced employing stripped down commercially available television chassis. Commercial entertainment television chassis which were employed for VDTs suffer several deficiencies. If less than all the scan lines were employed to complete a frame or picture, the characters displayed on the CRT were not well defined and/or suffered from noticeable decay of brightness which is called flicker. Heretofore, when all of the scan lines were employed to produce a dot-matrix character and the dots are tightly spaced, the character generator and the associated circuitry became large and expensive. When a standard commercial television raster scan circuit is modified to increase the frequency or the number of scan lines, the cost of the CRT controls is greatly increased. Whenever a more dense dot matrix character generator is employed with a greater number of raster scan lines, the dot-matrix character generator and associated circuitry is made more expensive.

Accordingly, there is an unfulfilled need for a VDT which is extremely simple, relatively cheap and provides high resolution and high intensity flicker free display of alphanumeric characters for use with data processing systems.

2. Description of the Prior Art

Prior art visual display terminals (VDTs) which employ standard commercial television chassis without modification are adapted to be synchronized to the 60 cycle per second line frequency. Entertainment television sets employ raster scanning and produce 525 horizontal raster scan lines for each frame or picture shown on the television screen. The repetition rate of the presentation of the frames or pictures is 30 frames per second. Each frame or picture comprises two sets of horizontal scan lines which are interlaced. The first set of scan lines are produced during a first pass which scans all of the odd numbered lines beginning with ine 1 and ending with line 525. The second pass scans all of the even numbered scan lines beginning with line 2 and ending with line 524. The even numbered lines are scanned or placed between the odd numbered lines so as to produce two separate and distinct interlace patterns which combine together to form the single frame or picture. The reason two separate and distinct scan lines are employed in entertainment television sets is because the luminescence of the phosphors coated on the face of the television tubes decays rapidly. If all 525 lines were continuously presented on a single pass scan at a repetition rate of thirty frames per second, the top lines of the frame or picture would begin to decay before the bottom lines were completely produced causing a dimming which is referred to as flicker. The two interlace scans are each produced at a rate of 30 frames per second resulting in a frame or picture which appears to the observer to be presented at a repetition rate of 60 frames per second.

Most VDTs employing entertainment television set CRTs eliminate the second pass scan (the interlaced scan) and present only half the normal 525 horizontal scan lines. When the second pass scan is completely eliminated, the resulting picture or frame suffers from phosphor decay and causes the resulting picture to flicker.

It has been suggested that the second pass scan of entertainment type television sets can easily be modified so that the second pass scan retraces the odd numbered lines of first pass scan. When the second pass S is identically reproduced to coincide with the first pass scan, there is effectively produced a character display which has a repetition rate of 60 frames per second which would substantially eliminate flicker and would also tend to brighten and refresh the pattern produced on the first pass scan.

When half of the normal 525 scan lines are eliminated, the resolution of the character displayed is also reduced by half and for this reason VDTs employing television raster scanning with only half the number of scan lines have usually been restricted to alphanumeric display of data.

It has been suggested that the resolution of entertainment television raster scan displays could be improved if the normal number of 525 raster scan lines were greatly increased. When the number of raster scan lines is doubled, the resolution of the character being displayed can be doubled. The conversion of entertainment type television sets to greatly increase the number of scan lines is a very expensive procedure and merely offers a compromise to the choice of a selection of a special raster scan CRT display. Such special raster scan CRTs are presently produced having as many as 2,000 raster scan lines employed to produce a single frame or picture.

There is a second problems presented in producing alphanumeric information on a cathode ray tube employing television raster scanning techniques. Every bright dot being produced on the CRT screen is produced by intensifying the electron beam. Heretofore every possible dot position on the CRT screen required a memory bit in the dot-matrix character generator. The dot-matrix character generator produces characters by generating a series of discrete bright or dark dots at predetermined X and Y coordinate locations as the electron beam of the CRT is swept or scanned horizontally across the face of the CRT. Commercially available dot-matrix generators are available in width-to-height ratios of approximately 3 $\times$ 4. The most common are 5 $\times$ 7, 9 $\times$ 12 and 10 $\times$ 14 dot matrix generators. When these ratios are maintained in an entertainment television CRT, the horizontal access scan lines are generally capable of producing dot positions which are separated from each other by less than 120 nanoseconds; thus, any memory for a dot-matrix generator usually requires that the generator be dedicated to the visual display system.

Typical dot-matrix character generators employ Read-Only Memory (ROM) and generate dot patterns conforming to U.S. ASCII standards. A typical 5 $\times$ 7 dot-matrix generator for producing 128 characters is made by Monolithic Memories, Inc. of Sunnyvale, Cal. and is designated MM6061. This dot-matrix generator provides row scanning of the dot-matrix characters. The character generator is provided with 24 pins and is packaged in a dual inline configuration having a three input binary coded row address, a seven input binary coded character address and five parallel outputs which define the absence or presence of the dots for each row of the character being addressed. A minimum size dot-matrix for defining an alphanumeric character is a 5 × 7 dot-matrix. While this small dot-matrix saves on character generation memory costs, it leaves much to be desired from the standpoint of sharp definition and resolution. An increase in the size of this minimum dot-matrix is accompanied by an increase in the size of the dot-matrix character generator memory and associated circuitry. For example, a 10 × 14 dot-matrix requires a 140 bit memory storage for each character and this is four times the size of the memory storage required for the minimum 5 × 7 dot-matrix.

It has been suggested that each dot of a character in a dot-matrix character generator could be processed after leaving the character generator so that such lighted dot could be employed to produce four lighted dots. The electronic circuitry required to implement this suggestion would be extremely complex and in all probability would cost more than buying the larger size dot-matrix generators which are now available in modular packages such as the previously mentioned solid state ROM device.

Visual display terminals (VDT) are finding more and more uses in the data processing field. VDTs are generally employed for the efficient monitoring, editing, analyzing and displaying of data stored in data storage memories associated with data processing systems. Since VDTs can now be employed at remote locations and can be connected by direct wiring or phone links to a central data processing system, there have been larger numbers of VDTs associated with each data processing system. As many computers become both faster and cheaper, the field of practical economic application of additional VDTs has been expanded rapidly. Heretofore, attempts to simplify and/or miniaturize a VDT so as to provide a reliable and inexpensive display unit have not been successful.

SUMMARY OF THE INVENTION

It is a general object of the present invention to provide an improved character generator circuit system for a visual display terminal.

It is a principal object of the present invention to provide an improved VDT which comprises a dot-matrix character generator and a television raster scan CRT of the entertainment type.

It is a primary object of the present invention to provide a VDT system which approximately quadruples the dot density of a dot-matrix character generator.

It is another object of the present invention to provide an improved circuit for displaying lower case alphabet characters.

In accordance with these and other objects of the present invention, there is provided a dot-matrix generator system which comprises a dot-matrix generator for producing an X row by Y column dot-matrix output which is increased to a $(2X - 1) \times (2Y - 1)$ dot-matrix.

In practicing this invention, two adjacent rows of dots of a seven row 5 × 7 dot-matrix are stored in appropriate registers. A comparison is made as the data are being presented to the intensity grid of a raster scan television CRT. When vertically adjacent or diagonally adjacent dots are present in the rows under comparison, a dot is inserted half way in between the two adjacent dots. In similar manner, when horizontally adjacent dots are present in a row, a dot may be inserted half way between the two horizontally adjacent dots. In addition to the circuitry employed for improving resolution without enlarging the memory of the dot-matrix character generator, circuit means are provided which will detect the presence of a lower case alphabet character which normally extends below the line of an upper case character and means are provided for delaying the presentation of rows of dots of such lower case characters so as to displace them downwardly in proper display position for lower case characters.

DESCRIPTION OF THE PREFERRED EMBODIMENT

Figure 1:
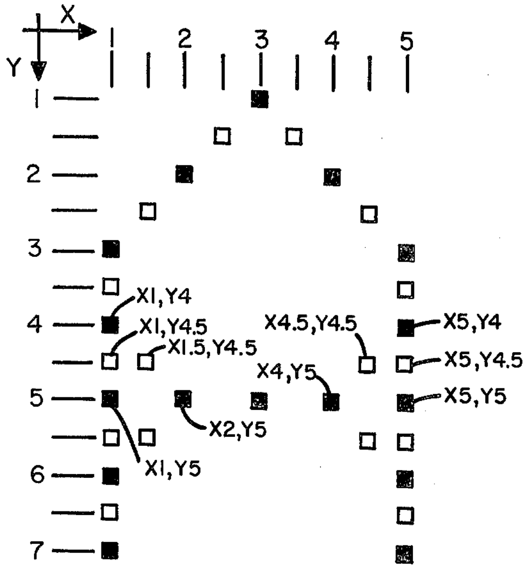
FIG. 1 is an illustration of a 5 × 7 dot-matrix display for an upper case "A" generated according to a preferred embodiment of the present invention.

FIG. 1 is a schematic illustration of an upper case "A." There are seven horizontal rows and five vertical columns numbered to show the relative position of the dark squares or dots which are generated by a dot-matrix character generator conforming to the ASCII code. For purposes of this description, the columns are numbered in the X axis direction and the rows are numbered in Y axis direction; thus, the upper most dark square is located at dot-matrix coordinate address X3, Y1 and the two hollow squares directly below are located at dot-matrix co-ordinate addresses X3, Y1 and the two hollow squares directly below are located at dot-matrix coordinate addresses X2.5, Y1.5 and X2.5, Y3.5 respectively. The dark squares represent the character which would be generated by a 5 × 7 dot-matrix character generator and the hollow squares represent the enhancement which will be displayed on the CRT as a result of the additional dots generated by logical circuitry employing the output of the 5 × 7 dot-matrix character generator. FIG. 1 illustrates that the output of a 5 × 7 dot-matrix can be expanded to a 9 × 13 dot-matrix pattern, thus increasing the definition and resolution as well as the brightness of the character presented.

Figure 2:
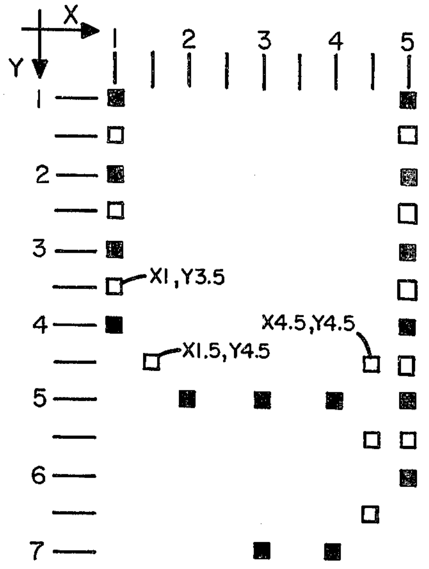
FIG. 2 is an illustration of a 5 × 7 dot-matrix display for a lower case "*y*" generated according to a preferred embodiment of the present invention.
Figure 4:
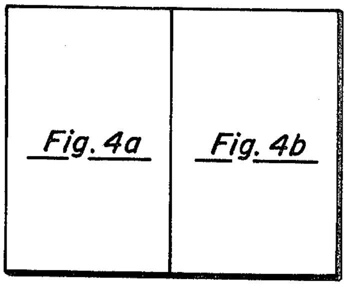
FIG. 4, comprising
Figure 5:
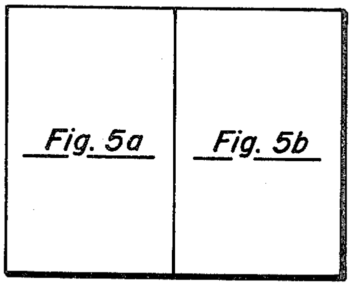
FIG. 5, comprising

FIG. 2 is a schematic illustration of a lower case "*y*" showing in dark squares the manner in which the character would be stored and generated by a dot-matrix character generator if no modification was made in the logical circuit system. The coordinate locations of the squares or dots are numbered in the same manner as the squares and dots in FIG. 1 so that the dark square at the left and top of character is located at coordinate address X1, Y1. As will be explained in greater detail hereinafter, the hollow squares are at the character addresses or locations where dots will be inserted during a real time comparison of the rows of dark squares. The composite of hollow and dark squares are the positions where dots will appear to form the character. The preferred embodiment logic system to be described hereinafter further modifys the location of characters such as *y, g, j, p* and *q* by moving the character downward relative to the bottom line (i.e., row 7) of the character being presented on the CRT display. In effect the character *y* shown in FIG. 2 will be presented on these CRT displays so that row 5 will appear on the bottom line or row 7 of the upper case characters being displayed.

In the preferred embodiment of the present invention the dot-matrix characters are five columns wide and have a separation space of one column between characters. There is provision for eighty characters requiring 480 dot columns along the X axis. By providing dot time separation of approximately 100 nanoseconds, the 480 dot columns can easily be centered on the CRT display within the useful horizontal scan time of 52 microseconds and still allow for approximately 14 microseconds horizontal retrace time. The preferred embodiment characters to be described are seven rows deep and have a row separation or space of three even scan lines between characters. There is provision for 25 lines of full characters requiring 250 dot rows. Entertainment television raster scan circuits are made to provide 262 horizontal scan lines on the first or even scan, thus it will be understood that the lesser number of 250 dot rows or horizontal even scan lines can easily be centered on the face of the CRT display.

Figure 3:
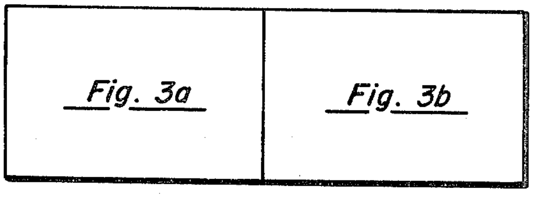
FIG. 3, comprising
Figure 3A:
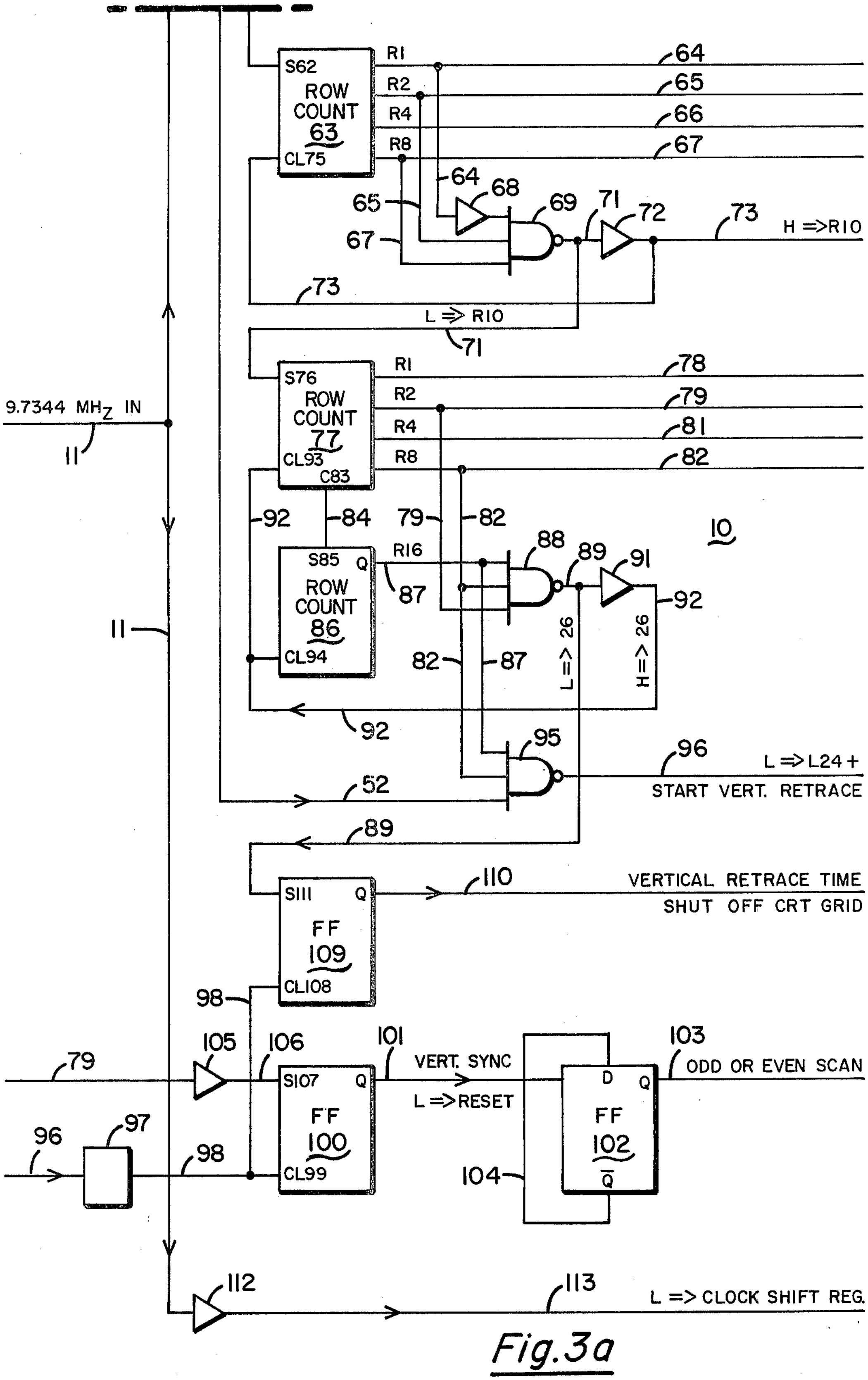
FIGS. 3*a* and 3*b* are a logic block diagram of the preferred embodiment timing circuit.
Figure 3B:
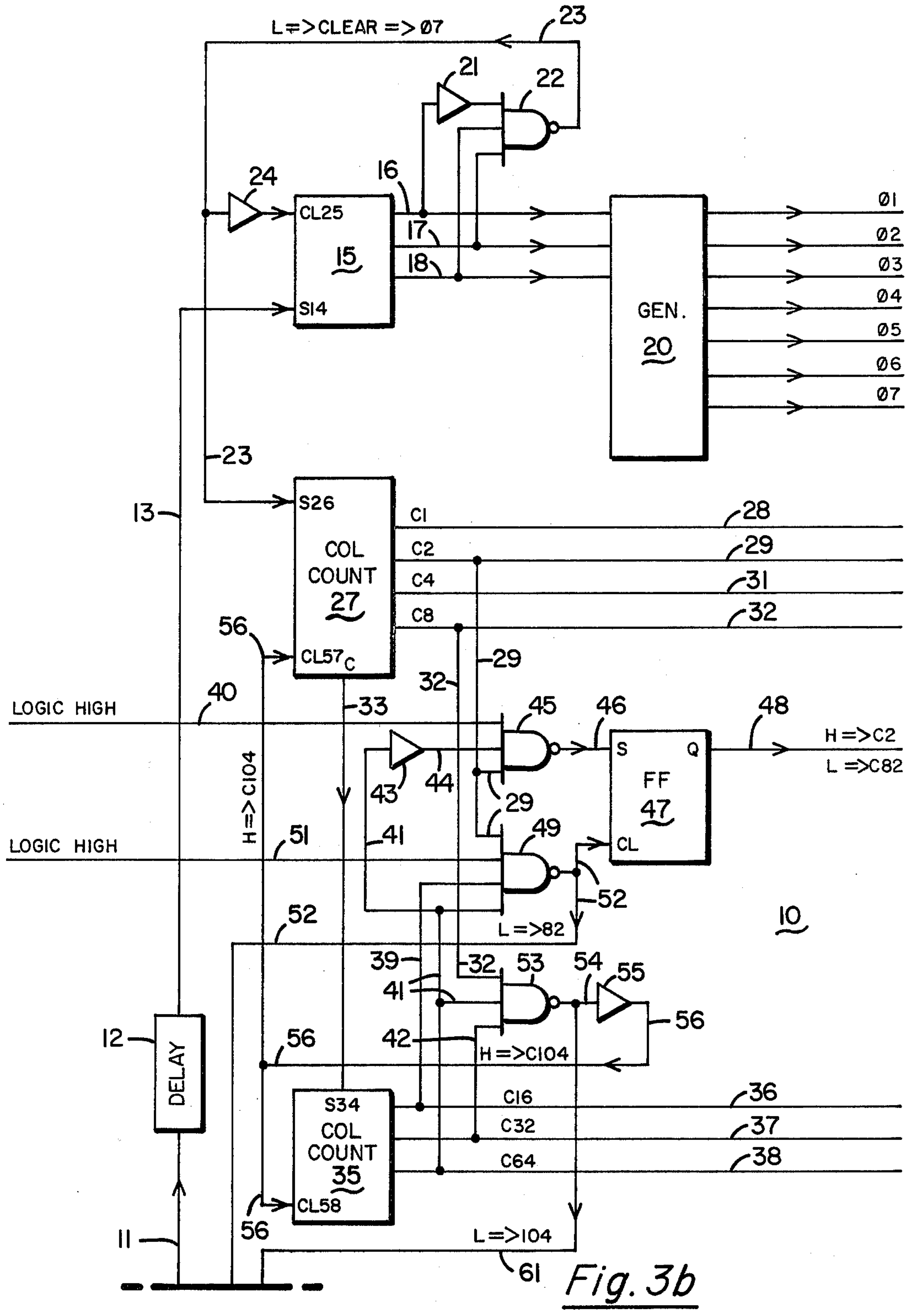

Refer now to FIGS. 3*a* and 3*b* showing the timing circuits for synchronizing the ogic circuits and the raster scan circuits of an entertainment type television set employed in the preferred embodiment. Timing means 10 has an input line 11 from a crystal oscillator providing a 9.7344 MGz signal. This frequency of oscillation occurs each 102.72847 nanoseconds and by amplifying and shaping the oscillation pulses, they may be used to synchronize the counters and registers in the timing means 10. Line 11 is shown connected to a delay 12 which comprises a plurality of amplifiers and wave-shaping elements. The output of delay 12 on line 13 is connected to the set or up-count side of binary counter 15. When binary counter 15 is cleared, it is set to 000 at the output of lines 16, 17 and 18. When the count reaches six or binary 101, the next pulse applied at input 14 will change the output binary count to 110 on lines 18, 17 and 16 respectively, thus, lines 17 and 18 are high and line 16 is low when the binary counter changes from a binary six to a binary seven. The low signal on line 16 is inverted in inverter 21 and applied as a high signal to NAND gate 22 along with the high signals on lines 17 and 18 producing a low output or clear signal on line 23 which is inverted at inverter 24 and applied to the clear side of binary counter 15 at input 25. The binary inputs, which last for a duration of approximately 103 nanoseconds, are applied on lines 16, 17 and 18 to phase generator 20 creating an output on one of the hase 1 ($\phi$1) to phase 7 ($\phi$7) lines. It will be understood that a binary 000 starts when the binary counter 15 is cleared and lasts until the next timing pulse is applied 103 nanoseconds later at input 14 of binary counter 15. Each successive input pulse at input 14 steps the phase generator to the next phase output line until the count attempts to step the phase generator to the phase 7 ($\phi$7) count output. The same input to phase generator 20 that would ordinarily generate a phase 7 output is gated in NAND gate 22 and applied as a clear signal pulse at terminal 25 of binary counter 15 to clear or reset the counter, thus, it is understood that the phase 7 output has no duration of 103 nanoseconds similar to the phase 1 to phase 6 outputs.

The output of NAND gate 22 on line 23 is applied to the set or countup input 26 of character counter 27. Modulo 16 binary counter 27 is cleared to start at the binary count of 000 and counts up to binary 15, then produces a carry pulse when it resets to zero on the count of 16. Line 28 represents the binary one character or one output. Line 29 represents the binary two or character two output. Line 31 represents the character four or binary four output and line 32 represents the character eight or binary eight output. It will be understood that lines connected to the character lines present a high output at their binary count.

After the binary count of fifteen, the next count pulse arriving at input 26 produces a carry-out on line 33 which is applied to the set or input terminal 34 of character counter 35. Character counter 35 in its clear condition has a binary 000 output. The first carry-in at terminal 34 causes line 36, representative of character 16, to go high as the lowest order binary one is set in character counter 35. The second carry-in causes the binary two line 37 which is representative of character 32 to go high and the fourth carry-in causes line 38, which is representative of character 64, to go high. It will be understood that character counters 27 and 35 are capable of counting 128 characters. Line 39 is connected to the character 16 count. Line 41 is connected to the character 64 count and line 42 is connected to the character 32 count. The low signal on line 41 is applied to inverter 43 and produces a high output on line 44 to NAND gate 45 when character 64 is not high. Column two produces a high output on line 29 which is applied to the input of NAND gate 45 and produces a low output on line 46 to the set side of intensity control flip-flop 47. At the character count of two the intensity control output at terminal Q goes high on line 48. This output may be applied through logic to the intensity grid of the cathode to produce the desired intensity of the electron beam of the cathode ray tube. The character two output on line 29 is applied as an input to NAND gate 49. The character sixteen output on line 39 and the character 64 output on line 41 are also applied to the input of the NAND gate 49. The logic highs on lines 40 and 51 are stabilizing inputs and do not change. When all three character counts representative of a character count of eighty-two are present at the input of NAND gate 49, a low clear signal is produced on line 52 which is applied to the clear side of intensity cntrol flip-flop 47, thus it will be understood that the condition on output line 48 of intensity control flip-flop 47 is high at character two and goes low at character 82.

Line 32 from character eight, line 42 from character 32 and line 41 from character 64 are connected as inputs to NAND gate 53. When all three inputs are present indicating a character 104 count condition, a low output from NAND gate 53 is produced on line 54 at the input of inverter 55. The high output on line 56, indicative of character 104, is applied s a clear signal to input terminal 57 of character counter 27 and to input terminal 58 of character counter 35.

Phase counter 20 is continuously running and is producing an output on the phase count lines. The phase count is synchronized with the presentation of the X columns of each individual character. The phase one count occurs during the space between characters and is employed to load the registers supplying the intensity control logic. The first character to be generated at the start of a line of characters represents the start of character count of two. When character counter 35 reaches the count of 82, no more characters will be produced because intensity control logic is turned off. The output on line 48 may also be used to trigger or start the refresh and horizontal synchronization of the electron beam. At the character count of 104, the electron beam has retraced and is at character position 0 ready to start another horizontal trace. At this time the character counters 27 and 35 are reset to zero and the next row of the character may be scanned starting with a character count of two and ending with the start of character count 82.

The low active signal on line 61 from NAND gate 53 is applied to the set or count-up side 62 of row counter 63, which provides a binary output on lines 64, 65, 66 and 67 representative of the binary counts of one, two four and eight. The high output on line 65 from row two, a high output from row eight on line 67 and a low output on line 64 inverted in inverter 68 and applied to the input of NAND gate 69 provides a low output on the count of ten on line 71. The low output on line 71 is inverted in inverter 72 providing a high output on line 73 indicative of a row ten condition. The high signal on line 73 is applied to the clear input 75 of row counter 63 to return the row counter to 000. It will be understood that each time the electron beam scans the horizontal line and the count reaches 104, the row counter will receive a set input, and each time the row counter reaches 10 representative of the rows of the individual character, and three spaces therebetween, the row counter will be reset. The low active condition on line 71, representing a row 10 count, is applied to he set or count-up input terminal 76 of character row counter 77. Character row counter 77 is a binary counter and provides a one, two, four and eight binary output on lines 78, 79, 81, 82 representative of rows. After the count of 15, when character row counter 77 counts to zero, a carry is produced at carry terminal 83 on line 84 which is connected to the set or count-up side 85 of character row counter 86 which produces an output at the Q terminal on line 87 at the count of 16. The high active row count conditions from rows two, eight and 16 on lines 79, 82 and 87 are applied as inputs to NAND gate 88 generating a low active signal on line 89 at the character row count of 26. The low active signal on line 89 is inverted in inverter 91 and provides a high active signal at the character row count of 26 on line 92. The high active signal on line 92, respresentative of the start of the horizontal scan of the line 260 (start of character row 26) is applied to the clear input terminal 93 and 94 of character row counters 77 and 86 respectively. At the start of a line count of 260, the character row counters will be reset to zero and start to repeat the character line count and character row count.

Lines 82 and 87 indictive of row eight and row sixteen, are applied to NAND gate 95 to produce a row 24 output. Line 73 is applied to NAND gate 95 to hold the row count of 24 until the last or tenth line count of row 24. Line 52 is applied to NAND gate 95 to hold the line count of 250 (24 rows plus 10 lines) to the end of the 82 column count before starting the vertical retrace signal on line 96.

Line 96 is applied to the input logic card 97 to produce a reshaped output signal on line 98 which is applied to the clear side 99 of flip-flop 100. The clear side input signal produces a low or reset vertical sync signal on line 101 which is employed to start the vertical retrace. Line 101 is also connected as an input to flip-flop 102. The $\overline{Q}$ terminal of flip-flop 102 is connected to the data input terminal D via line 104 to provide alternate positive and negative data inputs to the flip-flop 102. The output on line 103 from terminal Q indicates whether the odd or even set of 260 lines of raster scanning are in progress.

The row two count on line 79 from row counter 77 is applied to inverter 105. The low input on line 106 is applied to the set side 107 of flip-flop 100. The row count on line 106 occurs two rows after the active input on line 98 so that the set side input produces the clear signal every other row and continues to hold the flip-flop in the clear or set state. Flip-flop 100 has its set or active input 98 connected to the clear side and the clear or inactive input 106 applied to the set side to produce the necessary low active signal at the Q terminal. The low active signal on line 98 is also applied to the clear input side 108 of flip-flop 109 to produce a low active signal starting at row 24 time on line 110. The low active signal on line 89, occurring at row 26 time is applied to the set side 111 of flip-flop 109 to reset or clear the Q terminal output on line 110. The vertical retrace time which occurs between row 24 and row 26 time on line 110 is employed to shut off the cathode ray tube intensity grid or the cathode to prevent a bright retrace line on the tube.

The basic timing signal of the crystal oscillator (not shown) has been amplified and shaped on line 11 and is applied to amplifier 112 to provide a low active clock shift register signal on line 113. The pulses appearing on line 113 are slightly ahead of the basic timing signals being applied to the binary counter 15 due to the delay in delay 12. The basic timing signals on line 113 occur every basic pulse time and may be employed to clock the shift registers to be explained hereinafter.

Figure 4A:
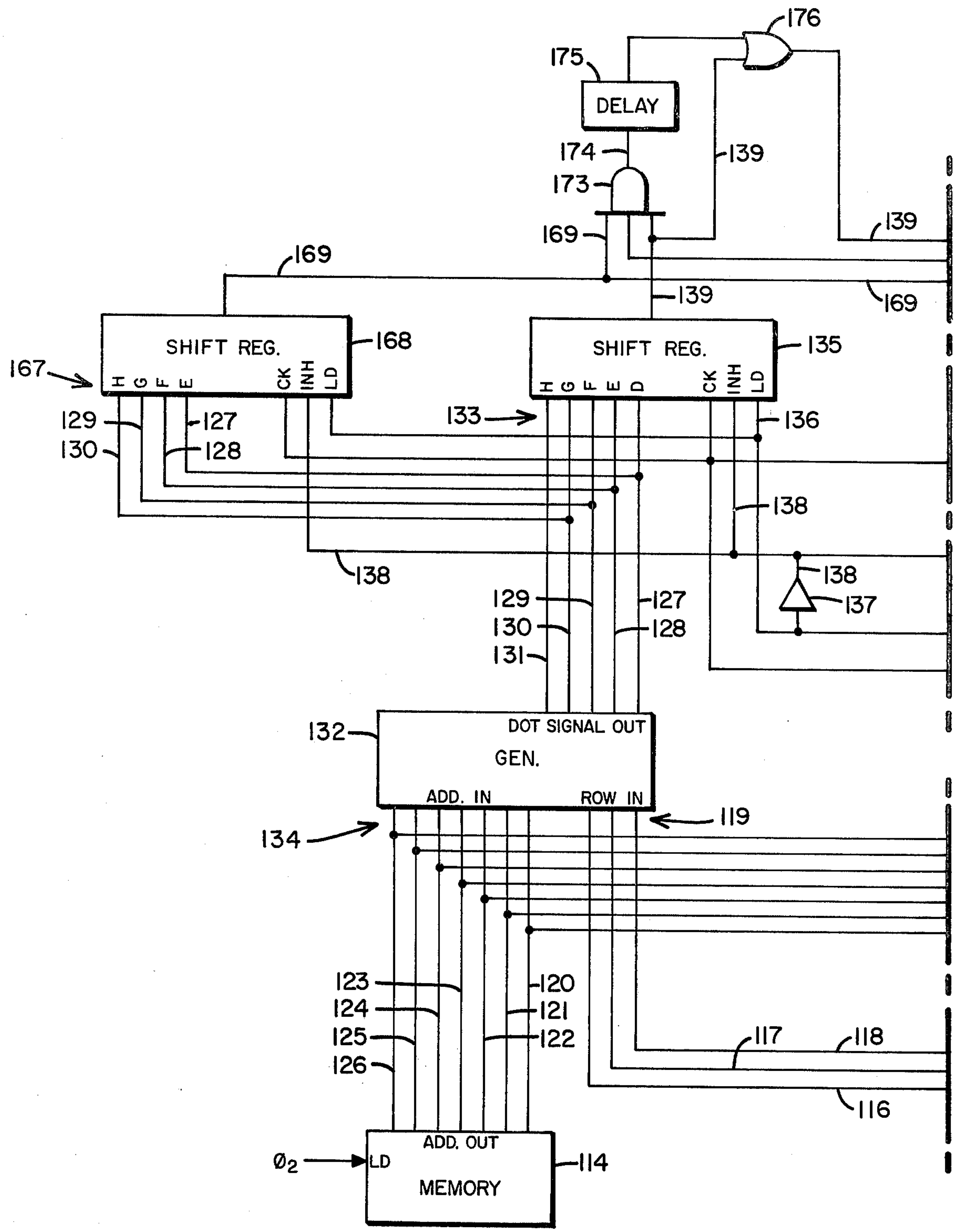
FIGS. 4*a* and 4*b* are a logic block diagram of a preferred embodiment circuit employed to modify the output of a standard dot-matrix character generator.
Figure 4B:
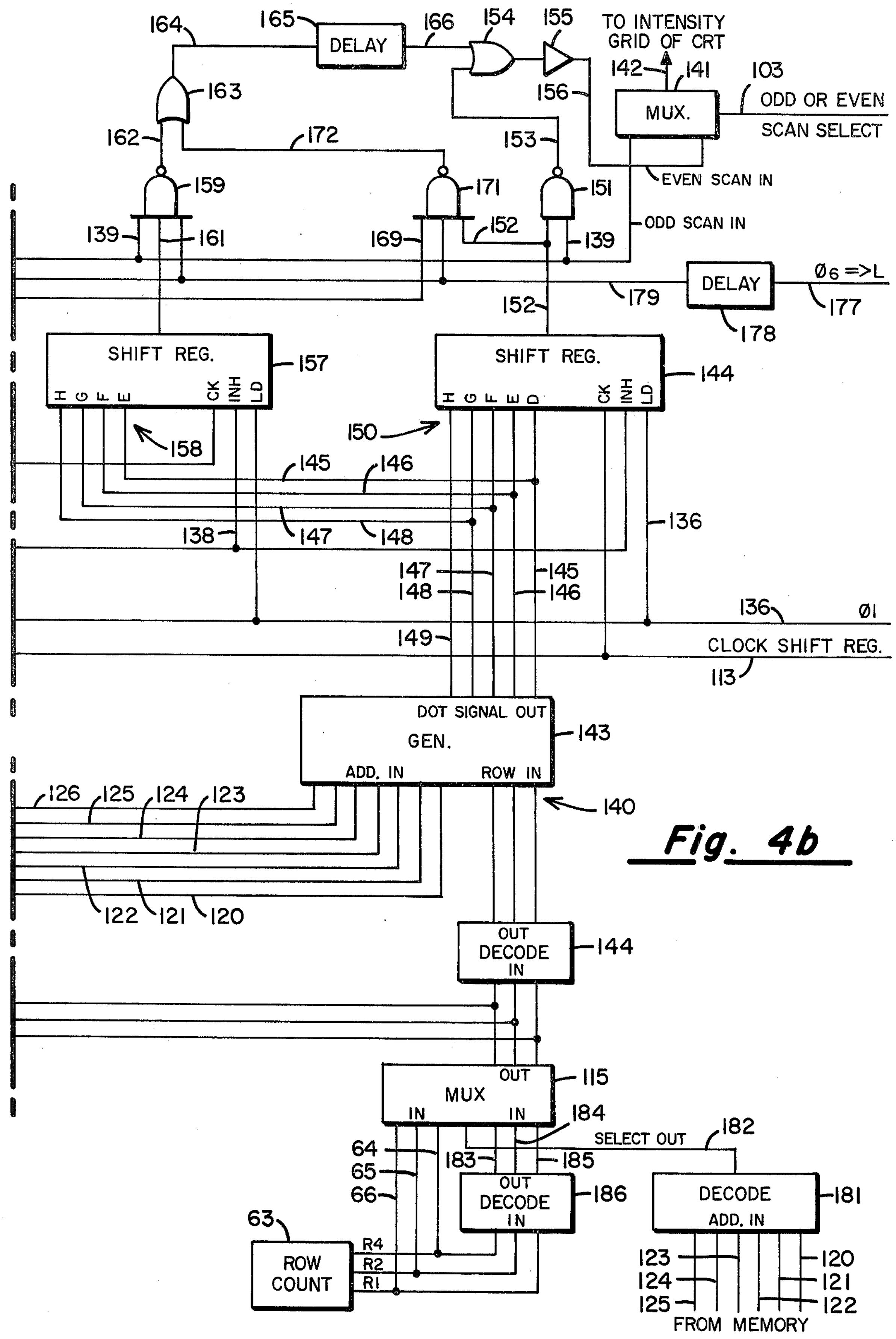

Refer now to FIGS. 4*a* and 4*b* showing the character dot-matrix generation system. The first three row counts, R1, R2 and R4 of row counter 63 are applied on input lines 64, 65 and 66 to a multiplexer 115 to produce the identical row counts on output lines 116, 117 and 118. The line row count on R1, R2 and R4 is capable of defining the first through the seventh row (line) of a dot matrix character in a 5 × 7 dot-matrix. This row address is supplied to row input 119 of dot-matrix character generator 132.

Memory system 114 defines one of the 128 characters stored in the character generator 132 on address output lines 120 to 126 at input terminals 134. The address presented on lines 120 to 126 is loaded into dot-matrix character generator 132 with a phase two pulse generated a phase generator 20. When the row address input is at row input terminals 119 and the character address input is at input terminals 134, the dot-matrix generator 132 produces a parallel output of five signals on lines 127 to 131 indicative of dots to be generated to define a row of the character being addressed.

The dot-matrix signals indicative of a row of the character are applied to the DEFG and H input terminals 133 of Y-row shift register 135. The phase one pulse on line 136, which follows the phase two pulse employedto load memory 114, is applied to the load terminal of shift register 135 causing the dot-matrix signal pattern on lines 127 to 131 to be set into shift register 135. The phase one load pulse on line 136 is inverted in inverter 137 and applied via line 138 to the inhibit terminals of the shift registers so that the shift registers cannot be loaded except during the phase one time following the previous loading of the memory 114 during a phase two time.

After shift register 135 is loaded with the dot-matrix pattern to be displayed on the cathode ray tube, a clock shift register signal on line 113 is applied every 103 nanoseconds to shift the dots of the dot-matrix pattern to the left, causing each of the dots stored in the shift register 135 to be presented at the output terminal 139. The dot signal on line 139 is applied directly to multiplexer 141. During the first, or odd scan, line 103 will select the direct through connection and the dot-matrix signal is connected to line 142 and applied to the intensity grid of the CRT causing the dots being shifted out of shift register 135 to be displayed sequentially 103 nanoseconds apart.

For purposes of this invention, the character generator 132 may be used to generate the dot signals for the next character which follows in the same horizontal row by maintaining the same row address at input 119 and changing the character address at input 134 at each phase two time. The series of dots on lines 127 to 131 are set in register 135 at the next following phase one time permitting the clock pulses on line 113 to shift the dot signals out. The phase one load time occurs during the time representative of the space between characters, thus, shift register 135 is loaded after being read out and before the next character is presented. After the electron beam has completed the first or odd scan of all of the characters to be presented on the full screen, the electron beam retraces vertically back to the top of the screen and starts the scan of the even lines. The even scan signal on line 103 to multiplexer 141 will select the path to only permit the even scan to be passed through multiplexer 141 to the control line 142.

During the second or even scan, the address of each charcter to be displayed is sequentially supplied from memory 114 to dot-matrix character generators 132 and 143. The row counter 63 supplied the row of the characters to be scanned on lines 64 to 66. The same row address that was supplied during the first or odd scan is provided to the input terminals 119 of dot-matrix character generator 132 via lines 116 to 118. The row address on lines 116 to 118 is also supplied to decoder 144 which adds one row count to the row address being supplied by row counter 63. This row count address plus one added is supplied to the row count input terminals 140 of dot-matrix character generator 143.

The dot-matrix pattern for a single row of a single character is transferred to shift register 135 as was performed previously with the odd scan. The dot-matrix pattern for the next following row of the same single character is simultaneously transferred to shift register 144 via dot matrix lines 145 to 149.

As an example of the dot-matrix signals representative of rows which are stored in registers 135 and 144, reference may be made to FIG. 1. When row four (4) of the dot-matrix for the character A is stored in register 135, row five (5) of the character is stored in register 144. A direct comparison of the dots being shifted out of these registers is being sequentially made at NAND gate 151. When two dots such as X1, Y4 and X1, Y5 occur simultaneously on lines 139 and 152, a single dot signal is produced on line 153. The signal passes via OR gate 154, inverter 155, line 156, multiplexer 141 to line 142 which produces the single signal for inserting dot X1, Y4.5 during the real time scanning of the even scan lines. In similar manner, when the column 5 dots are compared, the dot X5, Y4.5 will be inserted.

The row five (5) pattern of dots on lines 145 to 148 will also be set into shift register 157 at input terminals 158. The row five (5) dot-matrix pattern referred to above is shifted to the left one column so that the column one (1) dot is lost. At the same time NAND gate 151 is making a real time comparison of the vertically disposed dots, NAND gate 159 will be making a comparison of diagonally disposed dots. As an example, the X1, Y4 dot is being compared in NAND gate 159 with the X2, Y5 dot so as to produce the signal for inserting the dot shown at X1.5, Y4.5. The signal indicative of the row four (4) dots is presented on line 139 and the signals indicative of the dots being presented on row five (5) shifted to the left one column position, is being presented on line 161 and the comparison output is generated from NAND gate 159 on line 162. The comparison signal passes through OR gate 163 to delay 165. Delay 165 is designed to delay the presentation of dot X1.5. Y4.5 by one half of 103 nanoseconds so that it will appear on the visual display diagonally between dots X1, Y4 and X2, Y5. The real time signal from delay 165 on line 166 passes through OR gate 154, inverter 155 to line 156 and through multiplexer 141 to intensity control line 142.

In similar manner, the dot pattern on lines 127 to 130 is presented at input terminal 167 of shift register 168 in a manner which shifts row four (4) to the left one column position. The left shifted output on line 169 is compared in NAND gate 171 with the row five (5) input being presented on line 152. When the dot shown at X5, Y4 is compared with the dot shown at X4, Y5, and when comparison is made, the output on line 172 is passed through OR gate 163 to line 142 in the manner previously explained. The delayed output will cause the dot shown at X4.5, Y4.5 to be inserted in the dot position shown in FIG. 1.

The generation of the characters shown in FIGS. 1 and 2 require two raster scan passes which have hereinbefore been referred to as the even scan or first raster scan and the odd scan or the second raster scan. The second scan is interlaced between the rows of the first scan. During the first scan, dot-matrix character generator 128 produces a standard ASCII 5 × 7 dot-matrix pattern such as that shown by the dark dots in the 5 × 7 matrix of FIG. 1. During the even scan, the dot-matrix character generators 128 and 143 both produce standard ASCII 5 × 7 dot-matrix patterns; however, the dot-matrix patterns are processed in the logic gates 151, 159 and 171 to produce the dots, shown as hollow dots, between the dark dots in FIG. 1. The addition of the inserted hollow dots on the second scan effectively produces a 9 × 13 dot matrix employing only a 5 × 7 dot-matrix character generator.

Since the dots being generated are the result of turning on the cathode or controlling the intensity grid of the CRT, the dots are easily elongated in the horizontal or $x$ direction. It has not been found necessary to insert dots between horizontally adjacent dots of the 5 × 7 matrix. Should it be desirable to insert dots between horizontally adjacent dots of the 5 × 7 matrix, the output from register 135 can be compared with the output from register 168 in AND gate 173. The comparison signal on line 174 from AND gate 173 may be delayed one-half of one phase time in delay 175 before being buffered in OR gate 176 and applied to the multiplexer 141 via line 139.

To prevent insertion of dots between characters, the sixth column is left blank. A phase six signal is applied on line 177 to delay 178, and the output therefrom on line 179 is employed as an inhibit signal applied to the logic gates 159, 171 and 173.

Refer now to FIG. 2 and FIG. 4*b*. FIG. 2 shows in dark dots an ASCII 5 × 7 dot matrix pattern for a lower case "*y*". The numbered rows 1 to 7 are scanned on the first scan producing the dark dots. The interlaced unnumbered rows Y1.5, Y2.5 etc. are scanned on the second scan and the logic circuits comprising gates 151, 159 and 171 produce the inserted hollow dots such as those shown at X1, Y3.5; X4.5 and X4.5, Y4.5 in the manner described hereinbefore.

It will be noted that the "lower case *y*" if displayed in the time sequence in which it is generated by the dot-matrix generators 128 and 143 will appear to be two full rows of the 5 × 7 matrix above the line on which it should appear. The address from memory 114 on lines 120 to 126 is applied to decoder 181 and every lower case letter such as *g, j, p, q* and *y* or other characters such as , or ; and subnumbers may be detected to provide a select-out signal on line 182. The select-out signal on line 182 is applied to multiplexer 115 so that the row address on lines 183 to 185 are selected as the active input lines instead of lines 64 to 66. The row count on lines 64 to 66 is applied to decoder 186 and a count of two rows is subtracted from the normal row count. The effect of substracting a count of two from the row count being applied to the matrix character generators 128 and 143 is to cause row one of FIG. 2 to be presented during the row three scan time and to cause row seven to be presented during the row nine scan time, thus, effectively lowering the lower case *y* two rows of the 5 × 7 dot-matrix pattern spacing without modification of the logic circuits or the character generation circuits.

It will be understood that the 5 × 7 dot-matrix pattern is being enhanced to an effective 9 × 13 dot-matrix pattern. There is one vertical column separating the characters and there are three horizontal rows separating each character, thus, the lower case *y* shown in FIG. 2 may be lowered two rows and still have one row separation between characters.

Figure 5A:
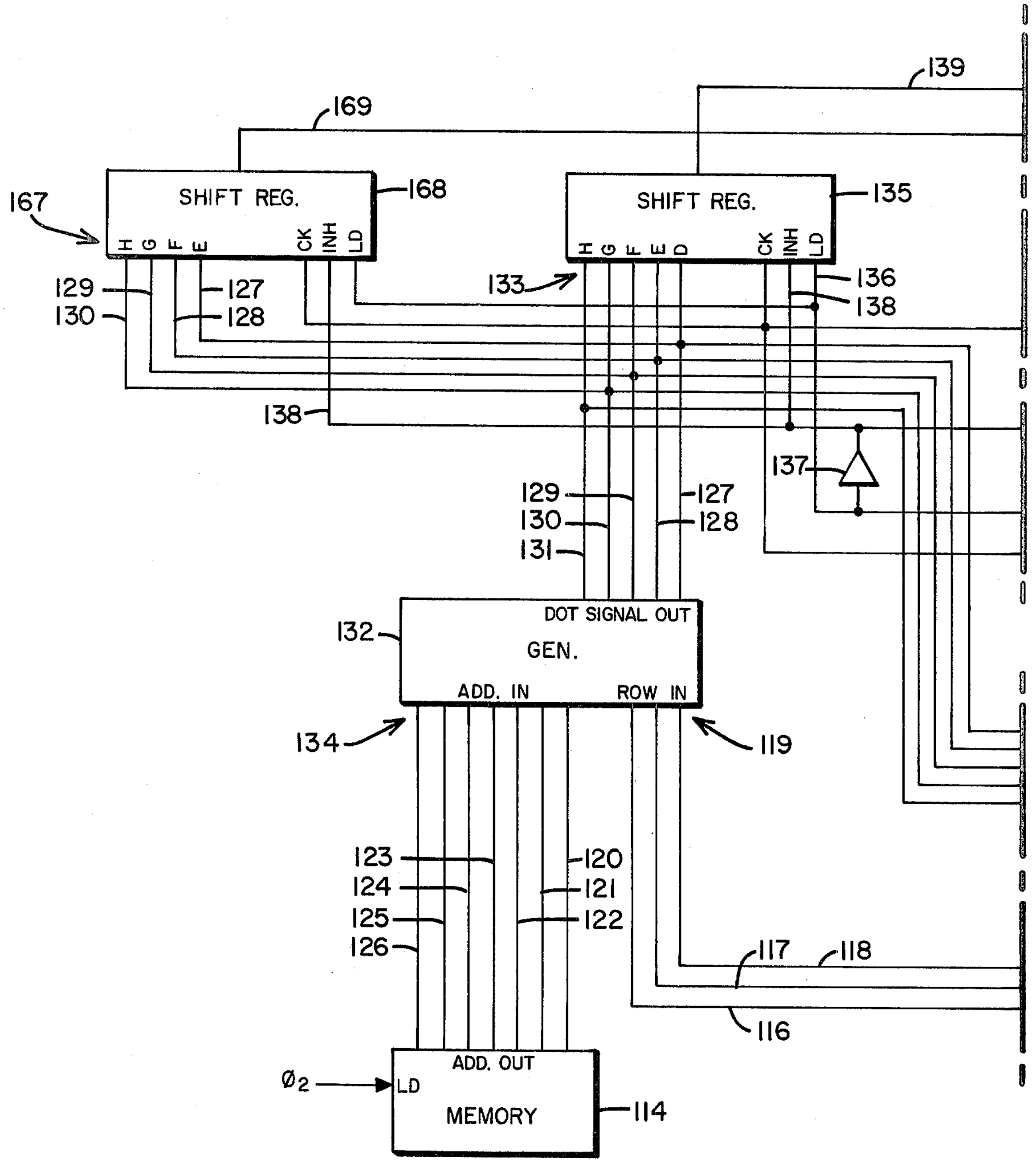
FIGS. 5*a* and 5*b* are a logic block diagram of a modification of the circuit of FIGS. 4*a* and 4*b* showing a circuit for generating a modified dot-matrix pattern employing a single dot-matrix generator.
Figure 5B:
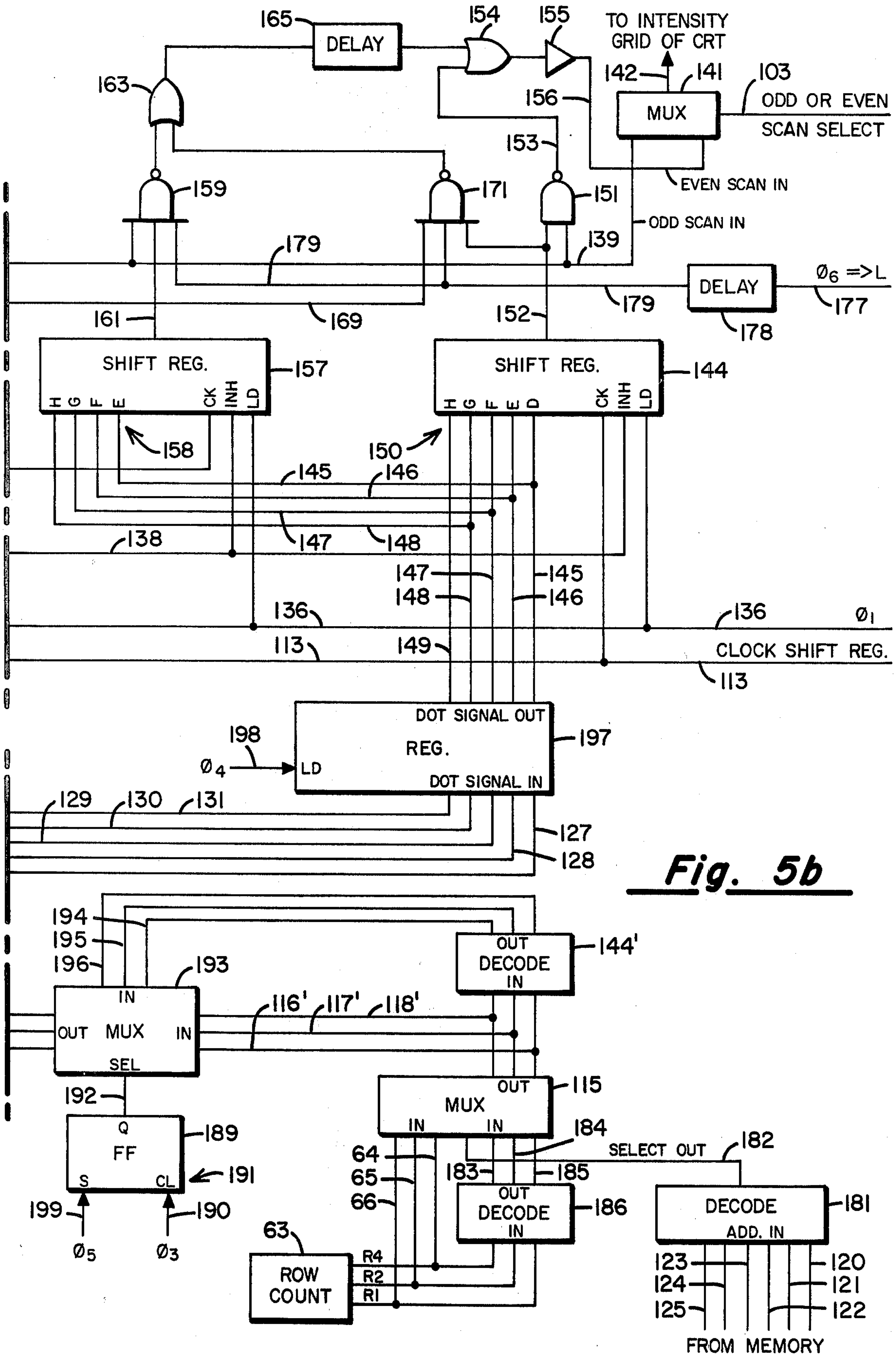

Refer now to FIGS. 5*a* and 5*b* showing a modification of FIGS. 4*a* and 4*b*. Dot-matrix character generators are much more expensive than other electronic hardware such as shift registers. In the preferred embodiment a 5 × 7 dot matrix generator has been described which cost about twenty times more than a standard shift register. When dot-matrix generators having greater density are employed, the cost ratio will increase exponentially. The modification shown in FIGS. 5*a* and 5*b* describes a system which will employ a single dot-matrix character generator to achieve the same result as that described hereinbefore with two character generators.

Memory 114, character generator 128, shift registers 135, 144, 157, 168 and the logic circuits comprising NAND gates 151, 159 and 171, etc., employ the same numbers and are structurally identical to those shown in FIGS. 4*a* and 4*b*. The modified mode of operation to be employed in the FIGS. 5*a* and 5*b* generates the address of the character to the character generator 132 on lines 120 to 126 as previously described; however, the row counts supplied on lines 116 to 118 applied to character generator 128 have been modified to provide two sets of dot-matrix row patterns on output lines 127 to 131 during each six phase times (one character row time).

At phase two time the address in memory 114 is supplied via lines 120 to 126 to address terminals 134 of character generator 132 and remain present until the next following phase two when the next character address is loaded into the dot-matrix character generator 132.

At phase three time a signal is applied on line 190 to the clear side 191 of flip-flop 189 to produce a low active output on line 192. Multiplexer 193 selects the row count input lines 194 to 196 from decoder 144'. As explained hereinbefore, decoder 144' will add one row count to the input row count being produced on lines 64 to 66. The row count on lines 194 to 196 will indicate the next row down of the character which is being addressed by row counter 63. The next row dot-matrix pattern is presented on lines 127 to 131 at phase three time and is loaded into dot-matrix bit register 197 at phase four by the load signal on line 198. At phase five time, a signal on line 199 sets flip-flop 189 producing a select signal on line 192 which causes multiplexer 193 to select input lines 116' to 118'. The row count signal on lines 116' to 118' are connected via lines 116 to 118 to terminals 119 and are the same row count signals which are being generated on lines 64 to 66 by row counter 63. At the next following phase one time, the phase one load signal on line 136 will load shift registers 135, 144, 157 and 168. It will be understood that the real time row dot-matrix pattern in dot-matrix character generator 132 will be loaded in shift register 135 and the same dot-matrix pattern shifted left one column will be loaded in shift register 168. In similar manner the next row dot-matrix pattern which was stored in bit register 197 during phase four time will be transferred to and stored in shift register 144. The same next row dot-matrix pattern shifted one column to the left will be stored in shift register 157. The dot-matrix patterns stored in shift registers 135, 144, 157 and 158 are shifted out by the clock pulses on line 113 and processed in the logic circuits during real time to produce output signals on line 142. Line 142 is connected to the intensity grid to produce the pattern of 9 × 13 matrix dots and inserted dots shown in FIGS. 1 and 2 and described hereinbefore with regard to FIGS. 4*a* and 4*b*.

The modification explained with regard to FIGS. 5*a* and 5*b* reduces the amount of electronic circuitry and electronic hardware, thus, reduces the cost of the visual display system and at the same time increases the reliability and precision of and display.

Any dot-matrix character generator of the type described with regard to dot-matrix character generator 128 may be increased from an *X* × *Y* dot-matrix character generator to a (2X − 1) × (2Y − 1) dot-matrix character generator with a negligible increase in cost of hardware and electronic circuitry.

We claim:

1. A system for intensifying and displaying dot-matrix characters of the type which includes a read-only memory for storing at addressable locations therein a plurality of characters, each said character being defined by a plurality of signals representative of Y rows and X columns of lighted discrete dot patterns to be displayed on a cathode ray tube, and memory addressing means for selecting one of said plurality of said characters, the improvement comprising:

a ready-only memory for receiving an address indicative of a character to be displayed and for generating a plurality of parallel signals representative of the Y row of dots of said dot-matrix character to be displayed, timing means, including row counting means, connected to said read-only memory for producing a discrete Y count of the row of dots of said dot-matrix character to be displayed, a Y row register connected to said read-only memory for receiving and storing said plurality of signals representative of said Y row of said discrete rows of dots being generated by said read-only memory, said Y row register being connected to the intensity grid of said cathode ray tube for indicating the absence or presence of signals representative of lighted dots of said dot-matrix character, scanning means for gating one of said signals from said Y row a column at a time to said cathode ray tube intensity grid, character row storage means for receiving and storing a plurality of signals representative of a Y + 1 row of said discrete rows of dots of said dot-matrix character to be displayed, said character row storage means being connected to said read-only memory, said row counting means comprising row counter advance means connected intermediate said read-only memory and said timing means for producing a Y + 1 count of the row of dots of said dot-matrix character to be displayed, a Y + 1 row register connected to said character row storage means for receiving and storing said plurality of signals representative of the Y + 1 row of said discrete rows of dots being generated by said character row register, and logic means connected intermediate said scanning means and said row registers for comparing the signals stored at the same column of said Y row and said Y + 1 row and for generating an intensifying signal representative of a dot to be inserted between said rows of adjacent dots in said dot matrix pattern.

2. A system as set forth in claim 1 wherein said character row storage means comprises a second read-only memory connected to said first read-only memory at said memory address means, and said timing means further includes switching means for connecting said row counter advance means to said second read-only memory for producing a Y + 1 count of the row of dots of said dot-matrix character to be displayed.

3. A system as set forth in claim 1 which further includes a decoding matrix connected intermediate said memory address means and said timing means for detecting address locations representative of lower case alphabetic characters requiring a dot matrix pattern extension below the last row of dots of said dot-matrix character to be displayed, and row counter delay means activated by the selection of one of said alphabetic characters for reducing the row count by one or more counts.

4. A system for intensifying and displaying dot-matrix characters of the type which includes a read-only memory for storing at addressable locations therein a plurality of characters, each said character being defined by a plurality of signals representative of Y rows and X columns of lighted discrete dot patterns to be displayed on a cathod ray tube, and memory addressing means for selecting one of said plurality of said characters, the improvement comprising:

a read-only memory for receiving an address indicative of a character to be displayed and for generating a plurality of parallel signals representative of the Y row of dots of said dot-matrix character to be displayed, timing means, including row counting means, connected to said read-only memory for producing a discrete Y count of the row of dots of said dot-matrix character to be displayed, a Y row register connected to said read-only memory for receiving and storing said plurality of signals representative of said Y row of said discrete rows of dots being generated by said read-only memory, said Y row register being connected to the intensity grid of said cathode ray tube for indicating the absence or presence of signals representative of lighted dots of said dot-matrix, scanning means for gating one of said signals of said Y row a column at a time to said cathode ray tube intensity grid, a second read-only memory for receiving said address indicative of a character to be displayed and for generating a plurality of parallel signals representative of one of said discrete rosw of dots of said dot-matrix character to be displayed, said row counting means comprising row counter advance means connected intermediate said second read-only memory and said timing means for producing a Y + 1 count of the row of dots of said dot-matrix character to be displayed, a Y + 1 row register connected to said second read-only memory for receiving and storing said plurality of signals representative of the Y + 1 row of said discrete rows of dots being generated by said second read-only memory, and logic means connected intermediate said scanning means and said row registers for comparing the signals stored at the same column of said Y row and said Y + 1 row and for generating an intensifying signal representative of a dot to be inserted between said rows of adjacent dots in said dot matrix pattern.

5. A system as set forth in claim 2 which further includes a Y + 1 row and X + 1 column register connected to said logic means and said second read-only memory for receiving and storing said plurality of signals representative of said Y + 1 row shifted to an X + 1 column position and wherein said logic means compares the signal stored at adjacent columns of said Y row and said Y + 1 row and generates an intensifying signal representative of a dot to be inserted between said rows of adjacent dots in said dot matrix pattern.

6. A system as set forth in claim 2 which further includes a Y row and X + 1 column register connected to said logic means and said first read-only memory for receiving and storing said plurality of signals representative of said Y row shifted to an X + 1 column position and wherein said logic means compares the signals stored at adjacent columns of said Y row and said Y + 1 row and generates an intensifying signal representative of a dot to be inserted between said rows of adjacent dots in said dot matrix pattern.

7. A system as set forth in claim 6 wherein said logic means comprises delay means for delaying the presentation of a dot to be inserted between dots occurring in adjacent columns and adjacent rows in said dot matrix pattern by a time equal to approximately one-half the time between adjacent horizontal dots.

8. A system as set forth in claim 4 which further includes a decoding matrix connected intermediate said memory address means and said timing means for detecting address locations representative of lower case alphabetic characters requiring a dot matrix pattern having an extension which extends below the last row of dots of said dot-matrix character to be displayed, and row counter delay means activated by the selection of one of said alphabetic characters for reducing the row count by one or more counts.

9. A system as set forth in claim 4 wherein said counter advance means comprises a decoding matrix for generating a binary output having a count increment one unit greater than the binary count input.

10. A system as set forth in claim 4 wherein said counter advance means comprises a binary counter incremented by the change in the row count of said row counting means.

11. A method of converting the output of an X × Y dot-matrix character generator to a (2X − 1) × (2Y − 1) dot-matrix output comprising the steps of:

generating an X × Y dot-matrix pattern from an X × Y dot-matrix character generator one row at a time, displaying said X × Y dot-matrix pattern on a first pass raster scan of a visual display terminal to provide X × Y dot-matrix characters, generating two discrete row patterns of said X × Y dot-matrix pattern, storing said two discrete row patterns of said dot-matrix pattern in storage means, logically comparing said two discrete row patterns of said dot-matrix pattern stored in said storage means, generating a plurality of dots according to said logical comparison of said two discrete row patterns of said dot-matrix pattern, and displaying said plurality of dots generated according to said logical comparison on a second pass raster scan of said visual display terminal, said second pass raster scan being interlaced between said first pass raster scan of said visual display terminal to provide (2X − 1) × (2Y − 1) dot-matrix characters.

* * * * *